Feb. 7, 1933.    F. J. BECHERT    1,896,879
SPRING END CONNECTION
Filed Nov. 3, 1928
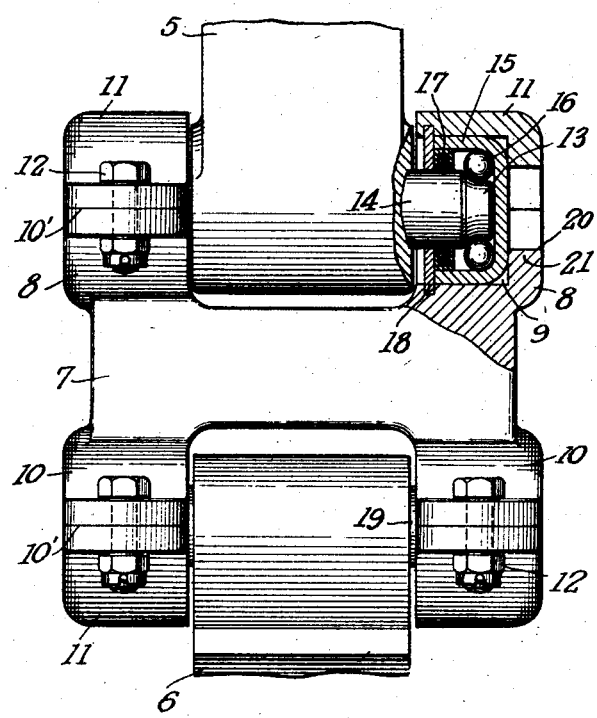
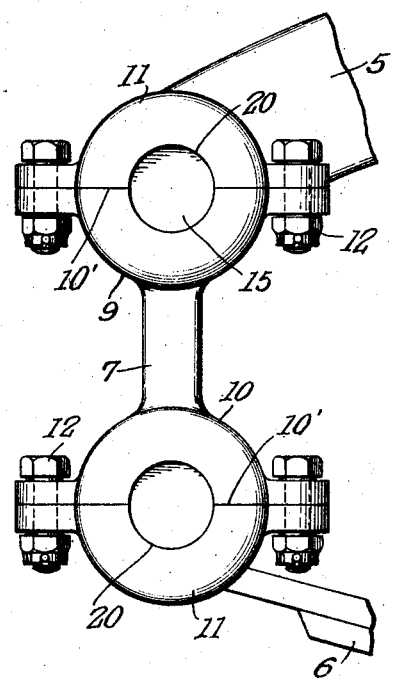
INVENTOR
Fred J. Bechert
BY
Mitchell Bechert
ATTORNEYS Patented Feb. 7, 1933

1,896,879

UNITED STATES PATENT OFFICE

FRED J. BECHERT, OF STAMFORD, CONNECTICUT, ASSIGNOR TO THE FAFNIR BEARING COMPANY, OF NEW BRITAIN, CONNECTICUT, A CORPORATION OF CONNECTICUT

SPRING END CONNECTION

Application filed November 3, 1928. Serial No. 316,910.

My invention relates to an antifriction spring shackle construction for connecting the frame and spring of a motor vehicle.

Among the objects of the invention are: to provide a simple and very rigid spring shackle for connecting a frame and spring; to provide a spring shackle which is simple in construction, readily manufactured, and which may be readily assembled and disassembled without especial skill.

Other objects will appear as the specification proceeds.

Briefly stated, in the preferred form of the invention, I provide a shackle member including a central rigid plate having aligned spaced apart partial bearing recesses at one end and similar bearing recesses at the opposite end, antifriction bearings including outer and inner bearing raceway means with interposed antifriction bearings are partially housed in said bearing recesses. Retaining means such as cover caps which preferably have partial bearing recesses therein complementary to those on the central rigid shackle plate serve to complete the bearing recesses and maintain the antifriction bearings therein. The vehicle frame carries at opposite sides two of the raceways of the bearings in one pair of aligned bearing recesses, while the spring carries two of the raceways of the antifriction bearings housed in the remaining bearing recesses.

In the drawing which shows, for illustrative purposes only, a preferred form of the invention—

Fig. 1 is an end view in partial section of a spring and frame connected by one form of my improved shackle;

Fig. 2 is a view in side elevation of the parts shown in Fig. 1.

In said drawing, 5 indicates a frame, while 6 indicates a spring to be connected thereto by means of my improved shackle. The shackle construction includes a central rigid shackle member or plate 7 having bosses 8—8 at one end thereof and provided with spaced apart and aligned bearing recesses as 9. At the opposite end of the rigid shackle member 7 are bosses 10—10 having bearing recesses similar to those shown in the sectional portion of the view. Since the shackle construction is substantially symmetrical and similar at all four corners, but one boss as 8 and associated parts has been shown in section and a description of this one end will suffice for all.

The housing recess 9 is preferably circular in section, and each boss 8 is divided along the plane 10', which preferably lies in a diameter of the circular bearing recess. The end portions of the housing recesses 9 are therefore formed in parts separate from the main central rigid portion 7, and are preferably formed in what may be termed retaining caps 11—11, which may be secured to the central portion as by means of simple bolts 12—12.

The recesses 9 carry antifriction bearings, which, in the form shown, include inner raceways 13 formed on means such as a pin 14 carried by the frame 5, and outer raceways formed in cups 15, which fit within and are held in the housing recesses 9. Antifriction bearing members such as balls 16 are interposed between the complementary inner and outer raceways, and the raceways are preferably inclined so that the antifriction bearing members take both radial and end thrusts to thus support the weight of the vehicle by the antifriction bearing members themselves and to cause the antifriction bearing members to take all axial thrusts. Means such as a dust ring 17 may be employed for excluding dust from and retaining lubricant on the bearing surfaces. If desired a plate 18 may be employed for closing the inner sides of each housing. The spring 6 may carry a pin 19, which may be the same as the pin 14 heretofore described, and which cooperates with adjacent parts after the manner heretofore described.

The end walls of the bearing recesses 9 may be provided with apertures 20 to facilitate the machining or other finishing of the bore and end walls of the bearing recesses 9. These apertures 20 are of smaller diameter than the bore of the recess 9, so that substantial lips or flanges 21 are provided to serve as substantial abutments for the race rings 15. Since the apertures 20 are of principal utility in the finishing of the shackle construction, these apertures could be closed by a plate similar to the plate 18 and interposed between the race ring 15 and the flanges or lips 21.

The spring shackle construction heretofore described may be very readily assembled. The pins 14 and 19 being rigidly held in the frame and spring with the ends projecting as shown, the race rings 15 and anti-friction bearing members, as balls 16, may be assembled on the projecting ends. With the cover caps 11 out of the way, the rigid shackle member 7 may be moved into place so as to properly house the outer rings 15 in the half bearings provided in alignment with each other and oppositely spaced as heretofore described. The spring end may be similarly assembled. The retaining cap members 11 may then be put in place, and the bolts 12 employed for holding the structure in unitary formation.

It will be seen that the rigid central shackle member 7 imparts great rigidity to the entire structure.

In manufacturing, it is desirable to have the raceways 16 at opposite ends of each pin 14, spaced apart a definite distance, and to have the abutment lips or flanges 21 forming the ends of opposite aligned bearing recesses spaced a definite distance apart, so that when the shackle and bearings are assembled, the balls or other antifriction members 16 will have just the desired fit on their respective raceways. By thus making the parts, a perfect fit will be assured by the mere act of assembling, and nothing is left to the judgment of the mechanic making the assembly. By making the parts non-adjustable, all parts will be readily interchangeable.

While I have described the invention as connecting a frame and spring of a vehicle, I wish to use the term "frame" in a generic sense, since there are cases when it might be desirable to connect the spring to an axle, and I wish the term "frame" to cover such a connection, since, obviously, it is not important, so far as the invention is concerned, whether the shackle connects the frame and spring or an axle and spring.

While the invention has been described in considerable detail, and one specific form illustrated, I do not wish to be strictly limited to the form shown, since changes may be made within the scope of the invention as defined in the appended claims.

I claim:

1. In an antifriction spring shackle construction, bearing raceway means to be carried by a frame, bearing raceway means to be carried by a spring, antifriction bearing members coacting with said raceway means to be carried by a spring and frame, a rigid shackle member having antifriction bearing recesses at the ends thereof for receiving said bearing raceway means, two of said recesses being arranged at each end of said shackle member, said recesses at one end of said shackle members opening oppositely to the recesses at the other end thereof, said recesses being substantially semicircular in section, cover members for retaining said antifriction bearing members assembled with said rigid shackle member and means at the outer ends of said recesses in said shackle member and cover members to engage said bearing raceway means to hold the same against outward displacement.

2. In an antifriction spring shackle construction, a pin to be secured to a frame and to project from opposite sides thereof, outer race rings surrounding said pin, antifriction bearing members interposed between the ends of said pin and said race rings, a pin to be secured to a spring and to project from opposite sides thereof, outer race rings surrounding said pin and antifriction bearing members interposed between said last mentioned outer race rings and the ends of said pin to be secured to said spring, a central rigid shackle member having spaced apart aligned half bearing recesses therein for receiving the outer bearing rings on the pin to be attached to said frame and having spaced apart aligned half bearing recesses to receive the outer race rings on said pin to be attached to said spring, said aligned half bearing recesses at the frame end of said shackle member being open in a direction opposite to the aligned half bearing recesses at the spring end of said shackle member and cover means for retaining said outer race rings in said recesses and means carried by said shackle member and said cover means and at the outer ends of said recesses for engaging said outer race rings to hold the same against outward displacement.

FRED J. BECHERT.